United States Patent [19]
St. John et al.

[11] Patent Number: 5,908,242
[45] Date of Patent: Jun. 1, 1999

[54] STAND MIXER WITH LOCKING CONNECTION BETWEEN THE MIXING BOWL AND THE BOWL SUPPORT

[75] Inventors: Robert A. St. John, Cheshire, Conn.; Paul R. Holbrook, Buffalo Grove, Ill.; John D. McNair, Yuen Long, The Hong Kong Special Administrative Region of the People's Republic of China

[73] Assignee: HP Intellectual Corp., Wilmington, Del.

[21] Appl. No.: 09/187,259

[22] Filed: Nov. 6, 1998

[51] Int. Cl.⁶ ............................ A47J 43/044; A47J 43/07
[52] U.S. Cl. ............................ 366/200; 403/354
[58] Field of Search ............................ 366/92–95, 100, 366/197, 199–201, 222–224, 331; 403/349, 354; 464/1

[56] References Cited

U.S. PATENT DOCUMENTS

| | | | |
|---|---|---|---|
| 1,926,910 | 9/1933 | Lynch | 366/201 |
| 2,008,184 | 7/1935 | Mross | 366/200 |
| 2,069,506 | 2/1937 | Ross | 366/201 |
| 2,157,153 | 5/1939 | Troche . | |
| 2,634,993 | 4/1953 | Hansson . | |
| 2,793,839 | 5/1957 | Kaufman | 366/199 |
| 2,798,700 | 7/1957 | Corbett et al. . | |
| 3,280,439 | 10/1966 | McCarthy . | |
| 3,466,715 | 9/1969 | McCarthy . | |
| 3,908,533 | 9/1975 | Fagerstrom et al. . | |
| 3,951,351 | 4/1976 | Ernster et al. | 366/200 |
| 4,015,935 | 4/1977 | Andersson et al. . | |
| 4,026,067 | 5/1977 | Wengel . | |
| 4,038,184 | 7/1977 | Svanteson . | |
| 4,305,180 | 12/1981 | Schwartz . | |
| 4,325,643 | 4/1982 | Scott et al. | 366/224 |
| 4,362,219 | 12/1982 | Carlsson . | |
| 4,577,975 | 3/1986 | McCrory et al. | 366/314 |
| 4,943,182 | 7/1990 | Hoblingre | 403/349 |
| 5,143,306 | 9/1992 | Nilsson . | |

*Primary Examiner*—Charles E. Cooley
*Attorney, Agent, or Firm*—Barry E. Deutsch

[57] ABSTRACT

A stand mixer comprising a lower housing with a support rotatably mounted thereto and a mixing bowl removably connected to the support. Between the mixing bowl and the support is a self-locking connection. The self-locking connection comprises the support having an aperture and the mixing bowl having a member fixably connected to the mixing bowl. The member fixedly connected to the mixing bowl is adapted to be inserted into the aperture of the support. The member has an engagement surface formed therein. The support has a cam surface. Rotation of the support drives the cam surface upon the engagement surface of the member. This rotates the member in unison with the support and cams down the mixing bowl against the support to lock the mixing bowl to the support.

18 Claims, 3 Drawing Sheets

STAND MIXER WITH LOCKING CONNECTION BETWEEN THE MIXING BOWL AND THE BOWL SUPPORT

BACKGROUND OF THE INVENTION

1. Field of the Invention

The present invention relates to stand mixers and, more particularly, to a stand mixer with a rotating bowl.

2. Prior Art

Various types of stand mixers are known in the prior art. Examples of stand mixers are disclosed in U.S. Pat. No. 4,362,219; U.S. Pat. No. 2,798,700 and U.S. Pat. No. 2,634,993.

SUMMARY OF THE INVENTION

In accordance with a first embodiment of the present invention a stand mixer is provided. The stand mixer comprises a lower housing with a support rotatably mounted thereto and a mixing bowl removably connected to the support. Between the mixing bowl and the support is a self-locking connection. The self-locking connection comprises the support having an aperture and the mixing bowl having a member fixably connected to the mixing bowl. The member fixedly connected to the mixing bowl is adapted to be inserted into the aperture of the support. The member has an engagement surface formed therein. The support has a cam surface. Rotation of the support drives the cam surface upon the engagement surface of the member. This rotates the member in unison with the support and cams down the mixing bowl against the support to lock the mixing bowl to the support.

In accordance with a second embodiment of the present invention a stand mixer is provided. The stand mixer comprises a lower housing with a support socket, means for rotating the socket and a mixing bowl. The lower housing has a support plate. The support socket is rotatably mounted to the support plate. The means for rotating the socket rotate the socket about a longitudinal axis of the socket. The mixing bowl is removably mounted to the support plate. The mixing bowl has a shaft adapted to be received into the socket. The socket has a cam and the shaft has an angled surface formed therein. The angled surface of the shaft is angled relative to the longitudinal axis of the socket. When the socket rotates about its longitudinal axis, the cam engages the angled surface of the shaft to bias the mixing bowl towards the support plate along the longitudinal axis of the socket and lock the mixing bowl to the support plate.

In accordance with a third embodiment of the present invention a stand mixer mixing bowl is provided. The stand mixer mixing bowl comprises a socket and a shaft. The socket is rotatably mounted to a base platform of a stand mixer. The socket has a bore formed therein and a pin projecting into the bore. The shaft is fixably mounted to the mixing bowl. The shaft is adapted to be received in the bore of the socket. The shaft has an angled slot formed therein. The angled slot is adapted to receive the pin when the shaft is inserted in the socket. The angled slot is angled relative to the bore in the socket so that when the socket rotates, the pin engages a side of the angled slot to rotate the shaft and urge the shaft into the socket.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
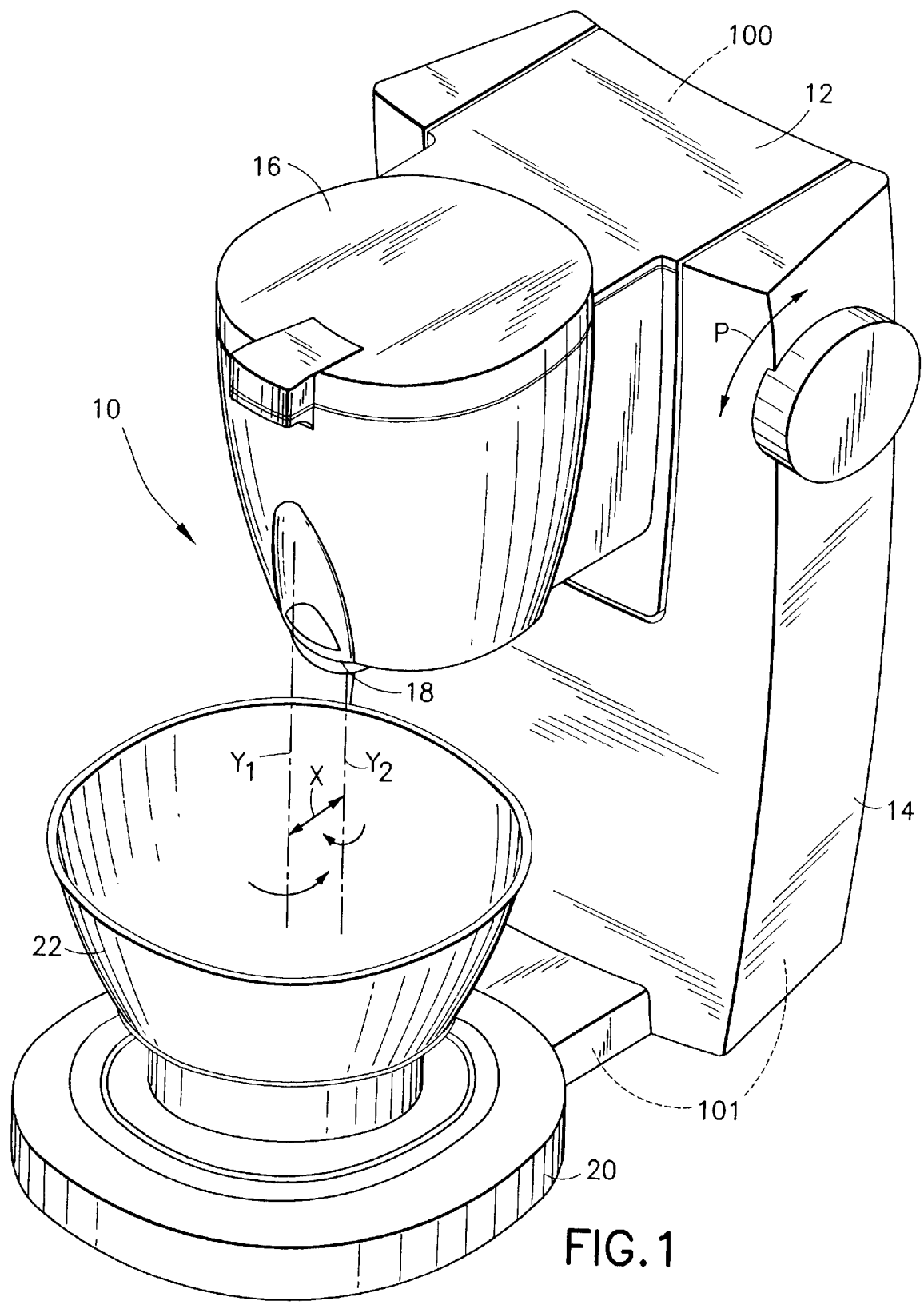
FIG. 1 is a perspective view of a stand mixer incorporating features of the present invention.

Referring to FIG. 1, there is shown a perspective view of a stand mixer 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The stand mixer 10 comprises an upper housing 12 and a lower housing 14. The upper housing 12 has an offset head section 16 with a chuck 18 adapted to generally hold a tool or implement therein (not shown). The lower housing 14 has a support pad 20 which supports a mixing bowl 22 generally under the head section 16 of the upper housing 12, so that implements held by the chuck 18 extend into the mixing bowl 22. The mixing bowl is removably mounted to the support pad 20. The upper housing 12 is pivotably mounted to the lower housing 14 to allow the upper housing 12 to be pivoted up and down relative to the lower housing 14 as indicated by arrows P in FIG. 1. The upper housing is pivoted up to insert or remove implements from the chuck 18. Also, when the upper housing is in the up position, the mixing bowl 22 may be removed or placed on the support pad 20. The upper housing 12 is rotated down to lower the implements held by the chuck 18 into the bowl 22 on the support pad 20 of the lower housing. The chuck 18 is rotatably mounted to the head section 16 to rotate an implement held by the chuck about a single axis of rotation Y2. The chuck 18 is rotated by a drive unit 100 generally located in the upper housing 12. The support pad has a rotatable mount 24 (see FIG. 2) to which the mixing bowl 22 is affixed when placed on the support pad 20. In the preferred embodiment, the rotatable mount 24 is rotated counter-clockwise relative to support pad 20 by the drive unit 100 in the upper housing 12 through an appropriate transmission system 101. In an alternate embodiment, the rotatable mount on the lower housing may be rotated by an independent drive unit located in the lower housing. In other alternate embodiments, the rotatable mount and hence the mixing bowl held thereon may be rotated clockwise. Rotation of the rotatable mount turns the mixing bowl 22 relative to the support pad 20 and also relative to the head section 16 of the stand mixer 10. The axis of rotation Y1 of the mixing bowl 22 is offset relative to a center axis Y2 of the chuck 18 on the head section 16 by a predetermined lateral distance X (see FIG. 1). The mixing bowl 22 and the tool in the chuck 18 rotate when the stand mixer 10 is operated.

Figure 2:
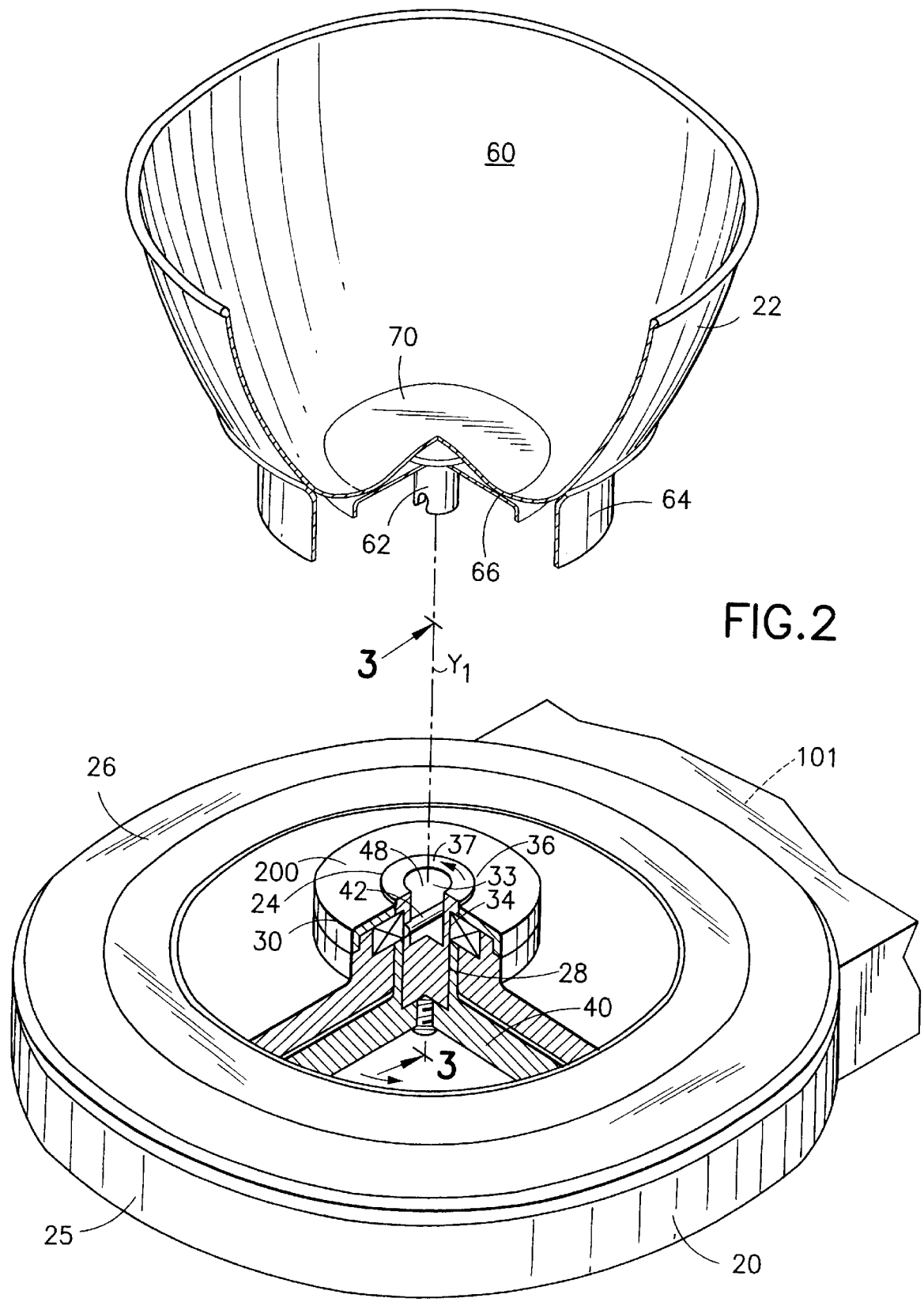
FIG. 2 is a cut away partial perspective view of a mixing bowl and lower housing of the stand mixer shown in FIG. 1, with the mixing bowl being shown removed from lower housing.
Figure 3:
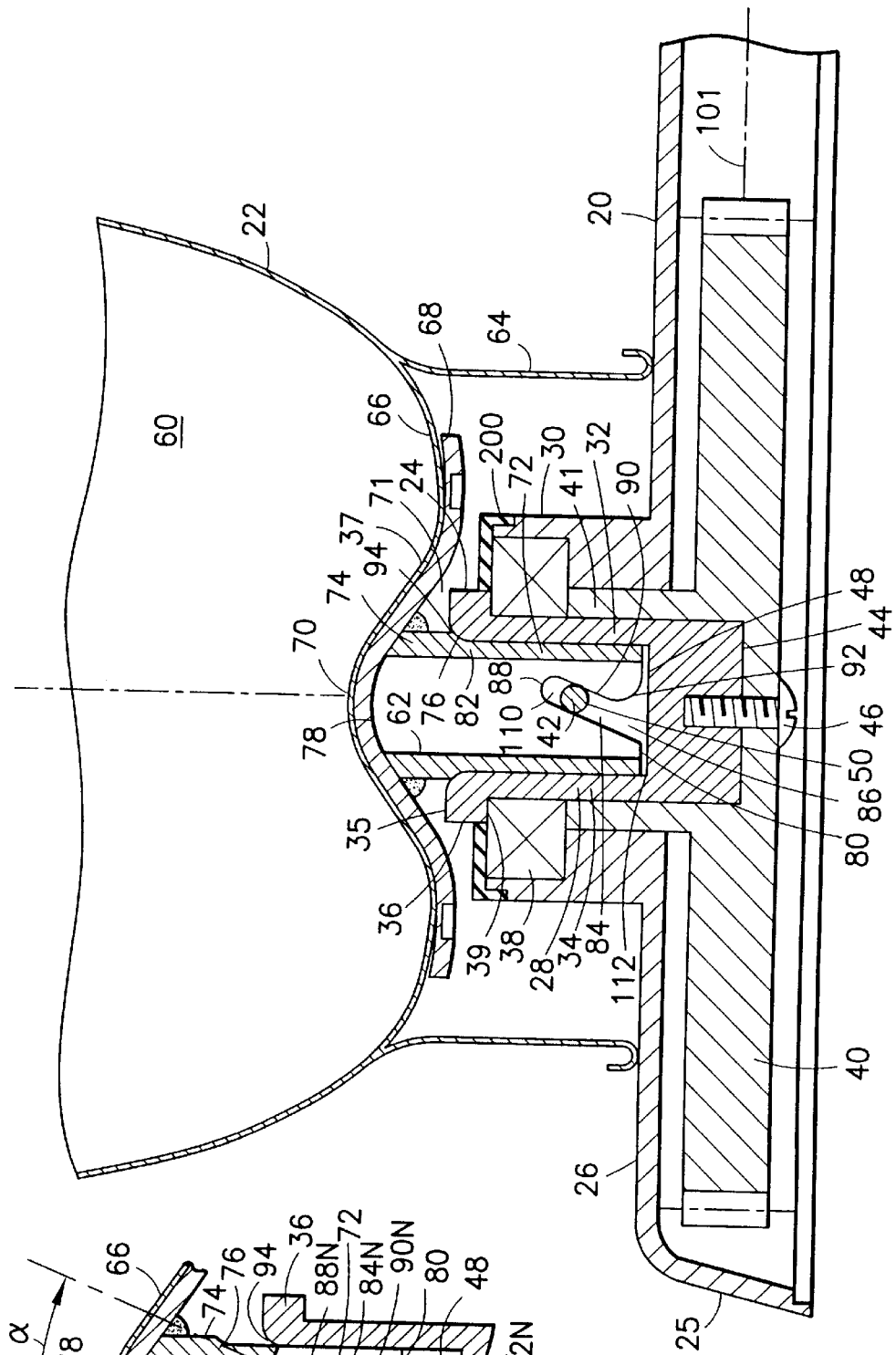
FIG. 3 is a cross-sectional elevation of the mixing bowl and lower housing shown in FIG. 2 with the mixing bowl supported by the lower housing.

Referring now to FIGS. 2 and 3, the support pad 20 has an outer cover or casing 25 with an upper surface 26 from which the rotatable mount 24 depends. The rotatable mount 24 generally comprises a coupling 28, a bearing 38 and a gear 40. The coupling 28 connects the mixing bowl 22 to the rotatable mount 24. The bearing 38 rotatably holds the coupling 28 to the outer casing 25 of the lower housing 20. The gear 40 operably interfaces with the drive unit 100 to rotate the coupling 28 relative to the lower housing 20. In the preferred embodiment, the coupling 28 is generally housed in a raised section 30 which projects above the upper surface 26 of the outer casing 25 (see FIG. 2). In alternate embodiments, the coupling may be housed in the outer casing of the lower housing so that the top of the coupling is substantially flush with the upper surface of the outer casing. As seen best in FIG. 3, the coupling 28 comprises a socket 32 having a pin 42 therein. The socket 32 has a substantially cylindrical body 34 with an outer support collar 36 cantilevered radially outward from the body 34. The cylindrical body 34 has a blind bore 48 formed into one end. The bore 48 is substantially concentric with the cylindrical body 34. The socket 32 is mounted in the outer casing 25 with the cylindrical body 34 orientated substantially vertical and the opening 33 of the bore 48 located at the top 37 (see FIGS. 2 and 3). The outer support collar 36 supports the socket 32 from the bearing 38. In the preferred embodiment, the outer support collar 36 is located at the top 37 of the socket 32. In alternate embodiments, the support collar may be located at any other suitable location such as the midbody or the bottom of the socket. The bearing 38 is housed in a conformal groove in the raised section 30 of the outer casing 25. The bearing 38 is held down to the outer casing 25 by an upper clamping plate 200 connected to the top of the raised section 30. The lower seating surface 39 of the support collar 36 is seated on the top of the bearing 38. The cylindrical body 34 is held radially within the bearing 38. The bearing 38 is of a type capable of supporting both thrust and radial loads, allowing the coupling 28 to rotate freely about axis of rotation Y1 relative to the lower housing 20. The gear 40 is mounted to the bottom 44 of the socket 32. The gear 40 is preferably a spur gear, although any other suitable type of gear may be used to operably connect the coupling to the transmission system 101. The gear 40 is connected to the socket 32 by a screw or bolt 46. The gear 40 has an annular section 41 which abuts against the bottom of the bearing 38. The bearing 38 is clamped in the coupling 28 between the support collar 36 of the socket 32 and the annular portion 41 of the gear 40 when the gear 40 is connected to the socket 34. Thus, the bearing 38, which is otherwise held to the outer casing 25 by the clamping plate 200, vertically secures the rotatable mount 24 to the outer casing 25. The gear 40 and socket 32 are interlocked so that torque may be transferred from the gear 40 to the socket 32 to rotate the coupling 28 relative to the lower housing 20. The pin 42 in the socket 32 is fixedly mounted to the cylindrical body 34 of the socket 32. The pin 42 extends substantially diametrically across the bore 48 of the socket as shown in FIG. 2. In the preferred embodiment, the pin 42 has a substantially round cross-section, and hence a substantially cylindrical outer surface 50. In alternate embodiments the pin may have any other suitable cross-sectional shape which defines a sloped or otherwise curved lower surface.

Still referring to FIGS. 2 and 3, the mixing bowl 22 comprises an upper bowl section 60, a connection shaft 62 and a skirt 64. The connection shaft 62 depends from the bottom 66 of the upper bowl section 60. The skirt 64 extends down from the upper bowl section 60 to generally surround the connection shaft 62. The connection shaft 62 is fixedly mounted to the bottom 66 of the bowl section 60. In the preferred embodiment, the bottom 66 of the upper bowl section 60 has a reinforcement plate or sheet 68 (see FIG. 3). The bottom 66 of the bowl section 60 has a dome shaped projection 70 on the inside of the bowl section 60 and a matching depression 71 on the exterior of the bowl 60. The dome shaped projection 70 and the matching depression 71 are substantially at the center of the bottom 66 of the upper bowl section 60. The top 78 of the connection shaft 62 is nested in the depression 71 and has a shape which conforms to the depression 71. The connection shaft 62 is brazed or welded to the reinforcement plate 68 to withstand the torque loads delivered by the shaft 62 to rotate the mixing bowl 22. In alternate embodiments, the bottom of the bowl, especially in the area proximate to the connection shaft, may be strengthened by any other suitable means and may have any suitable shape to allow the shaft to be adequately connected and facilitate rotation of the mixing bowl via the connection shaft.

Figure 4:
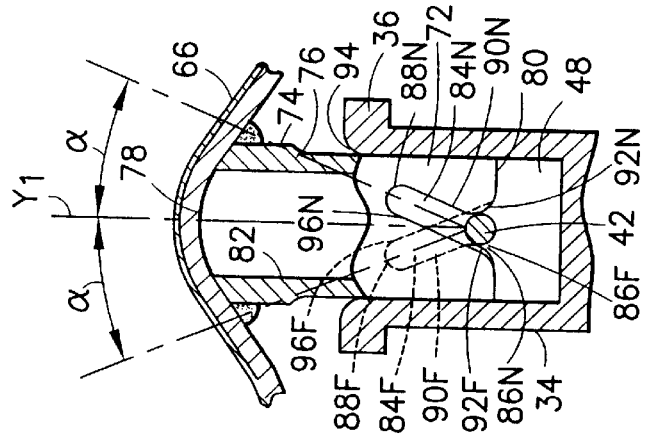
FIG. 4 is a partial cross-sectional elevation of a self-locking coupling between the mixing bowl and the lower housing with a shaft attached to the mixing bowl being partially removed from the socket of the coupling.

Referring now to FIGS. 3 and 4, the connection shaft 62 has a generally hollow cylindrical shape. In the preferred embodiment, the connection shaft 62 is made from stainless steel, although in alternate embodiments the shaft may be made from any other suitable material. The connection shaft 62 has a lower section 72 and an enlarged upper section 74. The connection shaft 62 also has a chamfered exterior surface 16 which transitions between the lower section 72 and the enlarged upper section 74. In the preferred embodiment, the chamfered surface 76 is chamfered to complement the chamfer on lip 94 of the coupling 28, though in alternate embodiments the chamfered surface may have any other suitable shape. The lower section 72 of the connection shaft 62 is adapted to be received up to the chamfered surface 76 in the bore 48 of the coupling 28 in the rotatable mount 24. As seen best in FIG. 4, the tube wall 82 of the lower section 72 has two slots 84N, 84F formed therein. The two slots 84N, 84F are located on the connection shaft 62 substantially diametrically opposite each other. FIG. 4 is a partial cross sectional elevation view of the connection shaft 62 which shows one slot 84N near side and the other slot 84F far side. Each slot 84N, 84F has an opening 86N, 86F in the bottom 80 of the connection shaft 62. The slots 84N, 84F are angled relative to the shaft 62. The slots 84N, 84F slope upward substantially symmetrically, extending helically in the tube wall 82 from their respective openings 86N, 86F in the bottom 80 of the shaft 62. In other words, both slots 84N, 84F have substantially the same helix angle α. Hence, as seen in FIG. 4, when viewing the connection shaft 62 from a side elevation, the near and far side slots 84N, 84F appear to be symmetrically diverging from the bottom 80 of the connection shaft. The helix angle or slope α of the slots 84N, 84F is selected to be in the same direction as the direction of rotation of the mixing bowl 22 on the rotatable mount 24 of the lower housing 14. Stated another way, the tops 88N, 88F of the slots 84N, 84F are displaced relative to the openings 86N, 86F in the same direction as the direction of rotation of the mixing bowl 22 when rotated by the rotatable mount 24. For example, if the rotatable mount 24 rotates the bowl 22 counter-clockwise, the slots 84N, 84F are formed in the shaft 62 to be helically angled counter-clockwise from the bottom up relative to the shaft 62 when viewed from the top (i.e. near slot 84N angled to the right and far slot 84F angled to the left as shown in FIG. 4). Conversely, if the mixing bowl is to be rotated clockwise, the helical angle of the slots 84N, 84F would be orientated clockwise from the bottom up relative to the shaft 62 when viewed from the top. The slots 84N, 84F are sufficiently wide to receive the pin 42 therein.

The leading or lower side 90N, 90F of each of the slots 84N, 84F has a rounded lower portion 92N, 92F which gives the openings 86N, 86F a generally flared shape (see FIGS. 3 and 4).

The procedure for mounting the mixing bowl 22 to the support pad 20 of the stand mixer 10 is substantially as follows. The user, holding the mixing bowl from the upper bowl section 60, places the mixing bowl 22 over the rotatable mount 24 and inserts the lower section 72 of the connection shaft 62 on the bowl into the socket 32 of the coupling 28. The user lowers the bowl 22 generally along axis Y1 until the bottom 80 of the connection shaft 62 contacts the pin 42 in the coupling 28 (see FIG. 2). At this time, the user may have to rotate the mixing bowl 22 relative to the coupling 28 to generally align the openings 86N, 86F of the slots 84N, 84F in the connection shaft 62 with the coupling pin 42, if the pin 42 and the slot openings are otherwise misaligned. The lower section 72 of the connection shaft 62 fits within the bore 48 of the socket 32 so that when the coupling pin 42 is generally aligned with one of the slot openings 86N, 86F, the pin 42 is also automatically generally aligned with the second slot opening 86F, 86N (see FIG. 4). Once the pin 42 is generally aligned with the slot openings 86N, 86F the round surface 88 of the pin 42 co-operates with the flared openings to guide the pin into the slots 84N, 84F. With the pin 42 in the slots 84N, 86F, the user continues lowering the bowl until the chamfered surface 76 of the connection shaft 62 abuts the lip 94 of the bore 48 in the socket 32. The upper sides 96N, 96F of the angled slots 84N, 84E ride upon the pin 42 and with the assistance of gravity generate a compound vertical and rotational motion of the mixing bowl 22 relative to the coupling 28 which allows the shaft 62 to be inserted into the socket 32 until the chamfered surface 76 rests against the coupling lip 94. Conversely, as the shaft 62 moves down into the coupling 28, the pin 42 slides up into the slots 84N, 84F. The interaction between both slots 84N, 84F and the coupling 28 is substantially the same and will be described hereafter with reference to one slot 84. As seen in FIG. 3, when the chamfered surface 76 on the shaft 62 rests against the coupling lip 94, a gap 110 remains between the pin 42 and the top 88 of the slot 84. In the preferred embodiment, a gap 112 also remains between the bottom 80 of the shaft 62 and the bottom 114 of the bore 48 in the socket 32. In alternate embodiments, the shaft may be resting against the bottom of the bore in the socket.

The mixing bowl 22 is locked automatically by the coupling 28 to the rotatable mount 24 in the lower housing 14 when the user operates the stand mixer 10. During operation of the stand mixer 10, the drive unit 100 drives the gear 40 (via transmission system 101) which in turn rotates the coupling 28 (i.e. the socket 32 and pin 42) counter-clockwise about axis Y1. The counter-clockwise rotation of the coupling 28 is transferred to the connection shaft 62 of the mixing bowl 22 by the pin 42. The pin 42, which is located in slot 84, is moved by rotation of the socket 32 against the lower side 90 of the slot. The rotating pin 42 thrusts against the side 90 of the slot 84 to rotate the shaft 62, and hence the mixing bowl 22, substantially in unison with the rotatable mount 24. In addition, the rounded exterior surface 50 of the pin 42 cooperates with the sloped lower side 90 of the slot 84 so that pin surface 50 is driven upward upon the sloped side 90 as the pin 42 is rotated counter-clockwise with the socket 32. As the pin 42 is driven upon the sloped lower side 90 of the slot 84, the pin 42 cams or forces the connection shaft 62 down along axis Y1 into the coupling 28. The cam down action generated by the pin 42 on the side 90 of the slot 84 biases the chamfered surface 76 of the connection shaft 62 against the lip 94 of the coupling 28. Therefore, as the mixing bowl 22 and rotatable mount 24 rotate substantially in unison, the connection shaft 62 is held locked between the pin 42 and the lip 94 of the coupling 28 thereby locking the mixing bowl 22 to the rotatable mount 24. Hence, the coupling 28 works as a self-locking coupling automatically locking the mixing bowl 22 down tightly to the support pad 20 of the lower housing 14 when the user operates the stand mixer 10.

The coupling 28 allows the user to unlock the mixing bowl 22 by turning off the stand mixer 10 and vertically lifting the mixing bowl 22 out of the coupling 28. Turning off the stand mixer 10 halts the rotation of the rotatable mount 24. When the rotatable mount 24 stops rotating, the pin 42 is no longer driven upon the sloped lower side 90 of the slot 84 in the mixing bowl connection shaft 62. Therefore, the cam down action of the pin 42 on the shaft 62 stops when the rotatable mount 24 stops turning. The chamfered surface 76 of the shaft 62, which was compressed against the lip 94 of the coupling 28 by the cam down action of the pin 42, resiles upward in the absence of this cam action. The chamfered surface 76 now merely rests against the lip 94 and is no longer compressed against the lip 94 as when the rotatable mount 24 rotates the mixing bowl 22. Without the cam down force of the pin 42 upon it, the shaft 62 is released from the clamp formed between pin 42 and the lip 94 of the coupling 28 when the rotatable mount 24 rotates. Thus, after de-energizing the stand mixer 10, the user lifts the bowl 22 along axis Y1. As the user lifts the bowl 22, the round exterior surface 50 of the pin 42 cams against the lower side 90 of slot 84 to rotate and release the bowl 22 from the coupling 28.

The present invention provides a stand mixer 10 which includes a self-locking coupling 28 which is unlocked easily after use. Amongst other things, the automatic locking feature of the present invention allows for easy installation (comprising substantially one step) of the mixing bowl 22 to the stand mixer 10, while ensuring that the mixing bowl 22 rotates virtually without wobble when the stand mixer 10 is operated. Removal of the mixing bowl 22 after using the stand mixer 10 is also easy with the coupling 28 of the present invention. Stand mixers of the prior art use a combination of gravity and an especially close fit between the mixing bowl connection shaft and the coupling to minimize wobble of rotating mixing bowls. However, the close fit substantially increases the difficulty of installing and of removing the mixing bowl from the mixer. For example, the narrow clearances associated with the close fit makes it very difficult to align and insert the shaft into the coupling when installing the mixing bowl, especially in view of the position of the insertion point which is hidden from the view of the user by the mixing bowl. This problem is exacerbated over time as dirt collects in the coupling. Also, manufacturing the coupling and shaft to the tight tolerances required to obtain a close fit is expensive. In other stand mixers of the prior art, the user is required to specifically engage locking features which secure the mixing bowl to the mixer to avoid wobble under rotation. These locking features must also be specifically disengaged by the user to remove the bowl form the stand mixer. The additional steps required to lock and unlock the bowl increase both the time and complexity of installing and removing the mixing bowl from the stand mixer. In contrast, the present invention eliminates these problems of the prior art. The self-locking coupling 28 makes installation and removal of the mixing bowl 22 from the stand mixer easy.

In alternate embodiments of the present invention, the relative placements of the coupling and the shaft may be switched such that the coupling is fixedly mounted to the mixing bowl and the shaft is rotatably mounted, as in the case of a rotating hub, to the lower housing of the stand mixer. In other alternate embodiments, the angled slots or features comparable thereto may be located in the coupling and the shaft may contain one or more pins or detents projecting therefrom to engage the slots in the coupling. In still other embodiments, an appropriate bushing may be used in place of the bearing, and the rotatable mount may include a idler pulley in lieu of the gear. Therefore, it should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a stand mixer comprising a lower housing with a support rotatably mounted thereto and a removable mixing bowl, wherein the improvement comprises:

a connection between the mixing bowl and the support comprising the support having an aperture and the mixing bowl having a member adapted to be inserted into the aperture of the support, the member having an engagement surface and the support having a cam surface, wherein rotation of the support drives the cam surface on the engagement surface of the member to rotate the member in unison with the support and to cam the mixing bowl down towards the support and lock the mixing bowl to the support.

2. A stand mixer as in claim 1, wherein the member comprises a seating surface disposed to abut a butting surface on the support, the seating surface being biased against the butting surface when the support drives the cam surface on the engagement surface of the member to rotate the member in unison with the support.

3. A stand mixer as in claim 1, wherein a portion of the member between the engagement surface and a seating surface of the member is clamped to the support by the cam surface and a stop surface of the support.

4. A stand mixer as in claim 1, wherein the member comprises a generally tubular shaft with a slot formed therein, a side of the slot forming the engagement surface of the member.

5. A stand mixer as in claim 1, wherein the member includes a generally tubular shaft and wherein the engagement surface comprises the tubular shaft having a groove with an angled portion, the angled portion of the groove being angled relative to the tubular shaft.

6. A stand mixer as in claim 5, wherein the tubular shaft has two of the grooves formed therein, the grooves being located on the tubular shaft generally diametrically opposite each other and wherein the angled portions of the two grooves are orientated generally symmetrically divergent relative to the tubular shaft.

7. A stand mixer as in claim 1, wherein the cam surface is located on an inner wall of the aperture.

8. A stand mixer as in claim 1, wherein the cam surface comprises a first cam part and a second cam part, the first and second cam parts being located generally diametrically opposite each other on an inner wall of the aperture.

9. A stand mixer as in claim 1, wherein a pin extends generally diametrically across the aperture, a curved surface of the pin forming the cam surface of the support.

10. A stand mixer as in claim 9, wherein the member has a slot formed therein, the slot being adapted to receive the pin therein, a side of the slot forming the engagement surface of the member and the end of the slot being located so that a gap is formed between the pin and the end of the slot when the support drives the curved surface of the pin against the side of the slot.

11. A stand mixer as in claim 1, wherein the engagement surface is configured so that when the mixing bowl is being lifted from the support the cam surface interacts with the engagement surface to automatically rotate the mixing bowl and unlock the mixing bowl from the support.

12. A stand mixer comprising;

a lower housing with a support plate, the support plate having a support socket rotatably mounted to the support plate;

means for rotating the socket about a longitudinal axis of the socket; and a mixing bowl removably mounted to the support plate, the mixing bowl having a shaft adapted to be received into the socket;

wherein the socket has a cam and the shaft has an angled surface formed therein, the angled surface in the shaft being angled relative to the longitudinal axis of the socket, and wherein when the socket rotates about its longitudinal axis, the cam engages the angled surface to bias the mixing bowl towards the support plate along the longitudinal axis of the socket and lock the mixing bowl to the support plate.

13. A stand mixer as in claim 12, wherein the angled surface is adapted to engage the cam when the mixing bowl is being lifted vertically from the support plate to automatically rotate the mixing bowl relative to the support plate and unlock the mixing bowl from the support plate.

14. A stand mixer as in claim 12, wherein the socket has a pin extending substantially diametrically across the socket, and wherein a surface of the pin forms the cam.

15. A stand mixer as in claim 12, wherein the shaft includes a hollow shaft with two slots formed therein, the slots being located substantially diametrically opposite each other.

16. A stand mixer as in claim 15, wherein the slots are formed generally helically around the shaft at generally the same helix angle relative to the shaft, and wherein a side of each of the slots forms the angled surface of the shaft.

17. A stand mixer mixing bowl coupling comprising:

a socket rotatably mounted to a base platform of a stand mixer, the socket having a bore formed therein and a pin projecting into the bore; and a shaft fixedly mounted to the mixing bowl, the shaft being adapted to be received in the bore of the socket and having an angled slot formed therein, the angled slot being adapted to receive the pin when the shaft is inserted in the socket;

wherein, the angled slot is angled relative to the bore in the socket so that when the socket rotates, the pin engages a side of the angled slot to rotate the shaft and to urge the shaft into the socket.

18. A stand mixer as in claim 17, wherein the shaft includes a generally cylindrical shaft, the angled slot being formed generally helically around the cylindrical shaft.

* * * * *